United States Patent
Leutz et al.

(10) Patent No.: US 7,024,784 B2
(45) Date of Patent: Apr. 11, 2006

(54) DEVICE EQUIPPED WITH A SENSOR

(75) Inventors: Steffen Leutz, Sinsheim (DE); Erhard Hoffmann, Altenriet (DE); Stefan Clauss, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 475 days.

(21) Appl. No.: 10/332,414

(22) PCT Filed: Apr. 17, 2002

(86) PCT No.: PCT/DE02/01416

§ 371 (c)(1),
(2), (4) Date: Jan. 8, 2003

(87) PCT Pub. No.: WO02/093466

PCT Pub. Date: Nov. 21, 2002

(65) Prior Publication Data

US 2004/0021634 A1 Feb. 5, 2004

(30) Foreign Application Priority Data

May 15, 2001 (DE) ................. 101 23 543

(51) Int. Cl.
*G06F 3/033* (2006.01)

(52) U.S. Cl. ................. 33/512; 340/573.1; 341/20
(58) Field of Classification Search ............. 33/501.08, 33/512, 516, 533, 613, 645; 341/22, 27, 341/31–33, 20; 345/156, 158; 340/573.1, 340/5.81, 5.82

See application file for complete search history.

(56) References Cited

U.S. PATENT DOCUMENTS

| 5,432,510 | A | * | 7/1995 | Matthews ................. 341/20 |
| 5,512,892 | A | | 4/1996 | Corballis et al. |
| 5,560,119 | A | | 10/1996 | LeBreton |
| 5,565,671 | A | | 10/1996 | Kirkeby |
| 5,648,798 | A | | 7/1997 | Hamling |
| 5,841,425 | A | | 11/1998 | Zenz |
| 5,909,207 | A | * | 6/1999 | Ho ......................... 345/156 |
| 5,920,642 | A | * | 7/1999 | Merjanian ................. 340/5.53 |
| 6,232,956 | B1 | * | 5/2001 | Mailman .................. 345/156 |
| 6,371,931 | B1 | * | 4/2002 | Guillen .................... 600/595 |
| 2003/0030012 | A1 | | 2/2003 | Ahlers et al |
| 2005/0009584 | A1 | * | 1/2005 | Park et al. ............... 455/575.6 |
| 2005/0052291 | A1 | * | 3/2005 | Backman et al. ........... 341/22 |

FOREIGN PATENT DOCUMENTS

DE 85 19 908.7 10/1985
DE 90 06 890.4 8/1991

(Continued)

OTHER PUBLICATIONS

Quicktionary, English Manual, HTTP://WWW.HEXAGLOT.DE.

*Primary Examiner*—G. Bradley Bennett
(74) *Attorney, Agent, or Firm*—Michael J. Striker

(57) ABSTRACT

The invention is based on a device (10) with a sensor, which is guided with one hand (20, 22) over a surface (14) and in which the data detected are displayed by a display unit (38). The invention proposes that grasping surfaces (40, 42) for the hand (20, 22) be positioned on two approximately diametrically opposed sides of a grip (12), at least one of which sides has a sensor (26, 28, 30, 32) that detects the number of fingers (20, 22) resting against this grasping surface (40, 42).

5 Claims, 2 Drawing Sheets

FOREIGN PATENT DOCUMENTS

| | | |
|---|---|---|
| DE | 41 20 975 A1 | 1/1993 |
| DE | 42 01 469 A1 | 7/1993 |
| DE | 197 36 396 A1 | 3/1998 |
| DE | 198 43 666 A1 | 3/2000 |
| EP | 0 311 113 A | 4/1989 |
| EP | 0 336 015 A | 10/1989 |
| EP | 0 445 426 A | 9/1991 |
| GB | 2 031 825 A | 4/1980 |

\* cited by examiner

DEVICE EQUIPPED WITH A SENSOR

BACKGROUND OF THE INVENTION

The invention is based on a device with a sensor.

There are known devices, which are moved by one hand over a surface so that a sensor can detect properties of the surface and the detected data can be displayed by means of a readout device, e.g. a display. For example, these devices can also be measuring devices that can measure distances, areas, or the like. With regard to the display, depending on the travel design and the grip design, the problem arises that in certain travel directions, the display is upside down and is therefore difficult to read, thus resulting in reading errors, particularly when the upside down numbers can signify other numbers that are not upside down, e.g. 6 and 9. One solution to this problem is to have the user of the device manually preset the direction of the display by means of an actuator. However, this step is often a nuisance and is therefore frequently skipped.

SUMMARY OF THE INVENTION

According to the invention, grasping surfaces for the hand are positioned on two approximately diametrically opposed sides of a grip, at least one of which sides has a sensor that detects the number of fingers resting against this grasping surface. In this connection, the grip and the grasping surfaces can be integral components of the housing of the device. It is only essential that the grip be in a preferred location on the housing of the device for maneuvering purposes so that the device is grasped at this location.

The invention is based on the knowledge that a different number of fingers of a hand rest against the diametrically opposed grasping surfaces. Whereas only the thumb rests against one grasping surface, several fingers of the hand rest against the other grasping surface. Since as a rule, the thumb points toward the user when grasping, the position of the thumb and of the other fingers permit the user's viewing direction to be deduced and consequently, the readout of the display unit can be oriented in the viewing direction.

The sensors detect the number of fingers resting against each grasping surface and generate a signal that orients the readout of the display unit accordingly. All suitable types of sensors can be used for this purpose, e.g. sensors that function according to a resistive, capacitive, or inductive measuring method, since the resistance, the capacitance, or the induction of a measuring circuit containing the sensors changes according to the number of fingers in contact with it. However, photoelectric sensors can also be used, which are covered to a greater or lesser degree by the fingers, thus changing the incidence of light. The signals of the sensors can be compared to reference values, which are characteristic of contact with the thumb or with the remaining fingers, thus allowing the device to detect whether the grasping surface is oriented toward or away from the body of the user. If sensors are provided on each grasping surface, their signals can be compared to each other in the evaluation unit.

One simple embodiment uses the resistive measuring method in which two neighboring contact strips are provided on each grasping surface and the resistance of a measuring circuit that is closed by the fingers is evaluated by means of an evaluation unit.

DETAILED DESCRIPTION OF THE EMBODIMENTS

Figure 1:
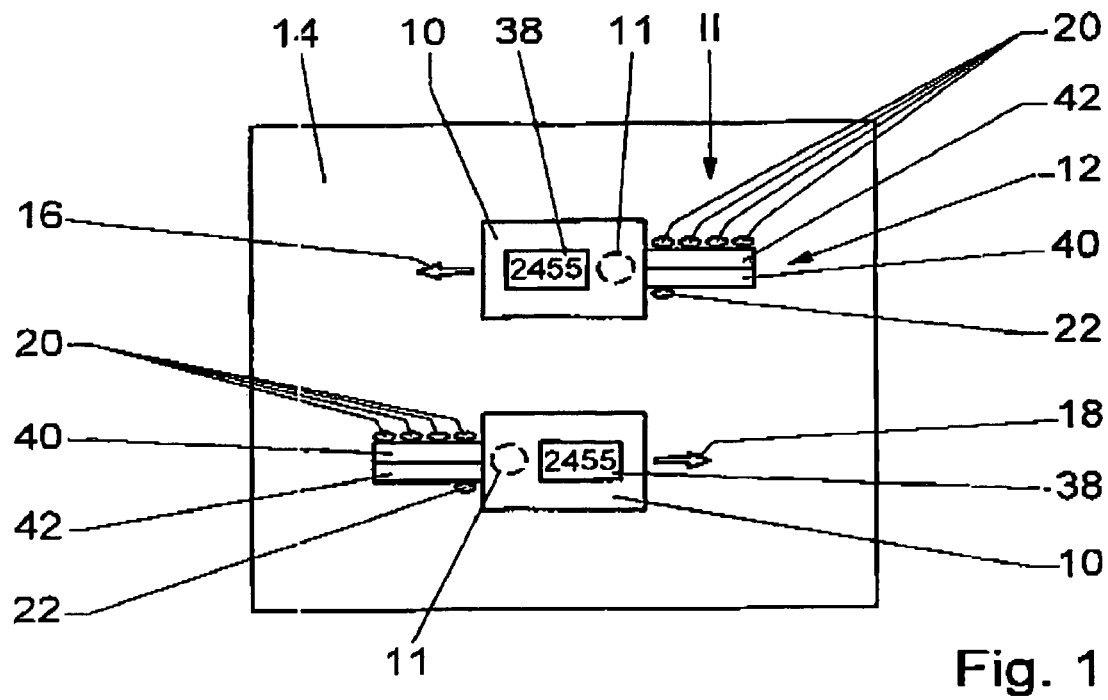
FIG. 1 shows a schematic top view of two devices according to the invention, which are oriented in opposite directions on a surface.

A device 10, e.g. a measuring device, is guided by hand over a surface 14. The device 10 has a sensor, not shown, which points toward the surface 14, and has a grip 12 with two diametrically opposed grasping surfaces 40 and 42. The device 10 also has a display unit 38, which displays the data detected by the sensor. If the device 10 is grasped with the right hand as depicted at the top in FIG. 1 and is moved in the usual way in the guiding direction 16, then a thumb 22 of the hand rests against the grasping surface 40, while the remaining fingers 20 rest against grasping surface 42.

Figure 2:
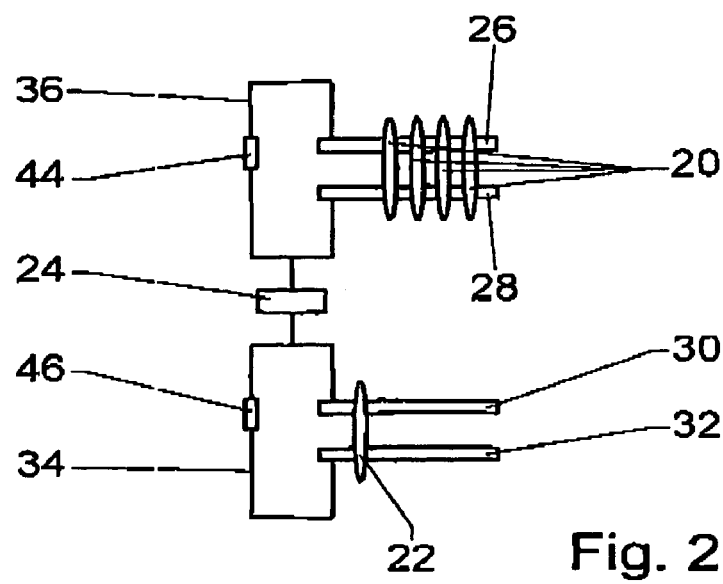
FIG. 2 shows a schematic developed view of two measuring circuits.
Figure 3:
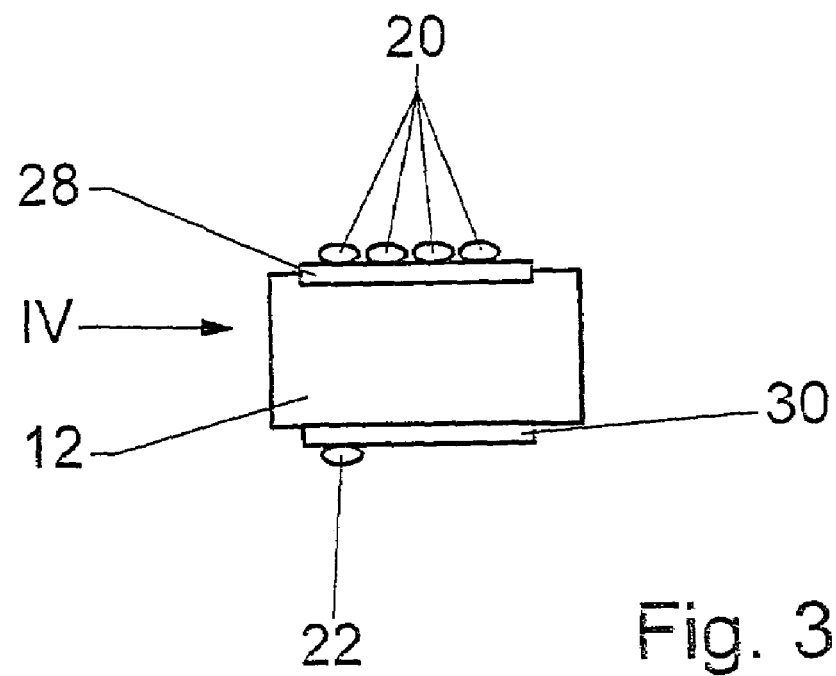
FIG. 3 shows an enlarged, schematic top view of a grip.
Figure 4:
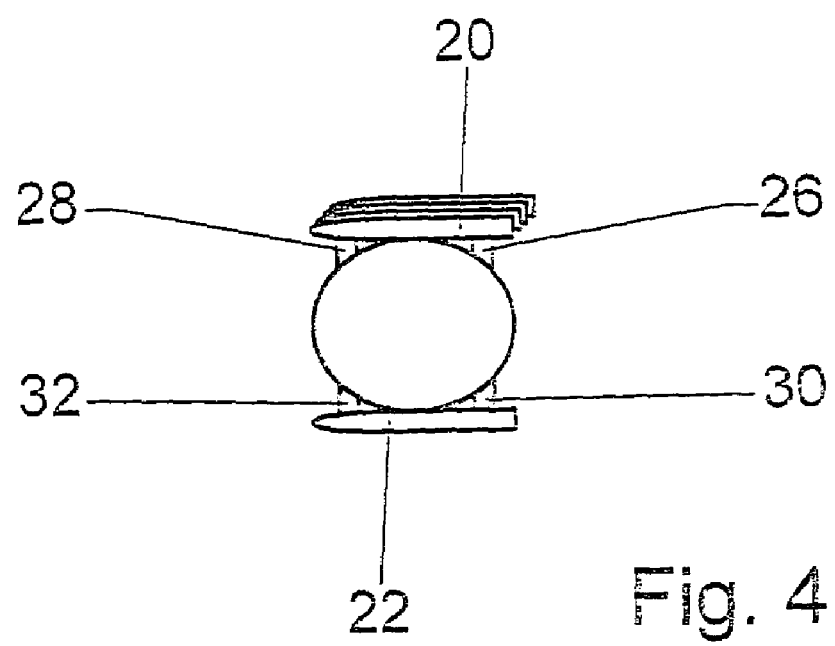
FIG. 4 shows a schematic view of a grip, viewed in the direction of an arrow IV in FIG. 3.

In the longitudinal direction of the grip 12, contact strips 26, 28 are embedded in the grasping surface 42 and contact strips 30, 32 are embedded in the grasping surface 40; these contact strips are depicted in a schematic developed view in FIG. 2. The thumb 22 bridges over the contact strips 30, 32 and closes a measuring circuit 34, whose resistance 46 is evaluated by an evaluation unit 24. In the same manner, this evaluation unit 24 also evaluates a resistance 44 of a measuring circuit 36, which is closed by the remaining fingers 20 resting against the contact strips 26, 28 of the grasping surface 42. Depending on the number of fingers 20, 22 bridging over the contact strips, the resistances 44 and 46 are approx. 0.3 M-Ohm to 2 M-Ohm, wherein the resistance 44 of the measuring circuit 36 that involves several fingers 20 is considerably lower than the resistance 46 of the measuring circuit 34 that involves only the thumb 22. Consequently, the evaluation unit 24 can generate an unambiguous signal for the readout of the display unit 38 by comparing the resistance values of the two measuring circuits 34 and 36 to each other. If the resistance value of the measuring circuit 34 is greater than that of the measuring circuit 36, then the right hand of the user is on the grip 12, whereas if the reverse is true, then the left hand is holding the grip 12.

The lower half of FIG. 1 shows the device 10 rotated by 180°, with a guiding direction 18. The handle 12 is now being grasped with the left hand, the thumb 22 resting against the grasping surface 42 with the contact strips 26, 28, while the remaining fingers 20 rest against the grasping surface 40 with the contact strips 30, 32. As a result, the evaluation unit 24 generates a signal, which rotates the readout of the display unit 38 by 180° so that the user can always read the readout in the correct direction.

If sensors 26, 28 or 30, 32 are only provided on one grasping surface 40 or 42, then the resistance values of the corresponding measuring circuit can be compared to a fixed reference value. If the resistance value is greater than the reference value, then only the thumb 22 is resting against the sensors 26, 28 or 30, 32; if the resistance value is less than the reference value, then the remaining fingers 20 are resting against the sensors 26, 28 or 30, 32.

REFERENCE NUMERALS

| | |
|---|---|
| 10 | device |
| 12 | grip |
| 14 | surface |
| 16 | guide direction |
| 18 | guide direction |
| 20 | fingers |
| 22 | thumb |
| 24 | evaluation unit |
| 26 | contact strip |
| 28 | contact strip |
| 30 | contact strip |
| 32 | contact strip |
| 34 | measuring circuit |
| 36 | measuring circuit |
| 38 | display unit |
| 40 | grasping surface |
| 42 | grasping surface |
| 44 | resistance |
| 46 | resistance |

The invention claimed is:

1. A device (10) with a sensor for detecting data, wherein the device is guided with one hand (20, 22) over a surface (14) by a thumb and at least one other finger of an operator and in which the data detected are displayed by a display unit (38), characterized in that grasping surfaces (40, 42) for be hand (20, 22) are positioned on two approximately diametrically opposed sides of a grip (12), at least one of which sides has a sensor (26, 28, 30, 32) that detects the number of fingers (20, 22) resting against this grasping surface (40, 42), wherein at least one of the grasping surfaces has a further sensor, wherein the further sensor is activatable by the thumb of the operator, wherein the device switches between left-handed and right-handed manipulation, wherein the device (10) switches the content of the display device (28) between a left-handed and right-handed representation depending on the number of the fingers (20, 22) identified.

2. The device (10) according to claim 1, wherein two neighboring contact strips (26, 28 or 30, 32) are provided as sensors (26, 28, 30, 32) and the resistance of a measuring circuit (34, 36) that is closed by the fingers (20, 22) evaluated by means of an evaluation unit (24).

3. The device (10) according to claim 2, wherein the sensors (26, 28, 30, 32) function according to a capacitive or inductive measuring method.

4. The device (10) according to claim 2, wherein the sensors (26, 28, 30, 32) are photoelectric sensors.

5. The device (10) according to claim 2, wherein sensors (26, 28; 30, 32) are provided on opposite grasping surfaces (40, 42), wherein the signals of the sensors (26, 28; 30, 32) of one grasping surface (40, 42) are compared to signals of the sensors (26, 28; 30, 32) of the other grasping surface (40, 42).

* * * * *